US009235567B2

(12) United States Patent
Mylonakis et al.

(10) Patent No.: US 9,235,567 B2
(45) Date of Patent: Jan. 12, 2016

(54) MULTI-DOMAIN MACHINE TRANSLATION MODEL ADAPTATION (71) Applicant: Xerox Corporation, Norwalk, CT (US)

(72) Inventors: Markos Mylonakis, Grenoble (FR); Nicola Cancedda, Grenoble (FR)

(73) Assignee: XEROX CORPORATION, Norwalk, CT (US)

( * ) Notice: Subject to any disclaimer, the term of this patent is extended or adjusted under 35 U.S.C. 154(b) by 371 days.

(21) Appl. No.: 13/740,508

(22) Filed: Jan. 14, 2013

(65) Prior Publication Data
US 2014/0200878 A1 Jul. 17, 2014

(51) Int. Cl.
G06F 17/27 (2006.01)
G06F 17/28 (2006.01)

(52) U.S. Cl.
CPC ........ G06F 17/2854 (2013.01); G06F 17/2818 (2013.01)

(58) Field of Classification Search
CPC .............................. G06F 17/28; G06F 17/2827
USPC .......................................................... 704/2, 4
See application file for complete search history.

(56) References Cited

U.S. PATENT DOCUMENTS

| 4,980,829 | A * | 12/1990 | Okajima et al. ................... 704/5 |
| 6,182,026 | B1 | 1/2001 | Tillmann et al. |
| 6,917,936 | B2 | 7/2005 | Cancedda |
| 2004/0024581 | A1 | 2/2004 | Koehn et al. |
| 2004/0030551 | A1 | 2/2004 | Marcu et al. |
| 2004/0255281 | A1 * | 12/2004 | Imamura et al. ............... 717/141 |
| 2005/0137854 | A1 | 6/2005 | Cancedda et al. |
| 2006/0190241 | A1 | 8/2006 | Goutte et al. |
| 2007/0094169 | A1 * | 4/2007 | Yamada et al. .................. 706/15 |
| 2007/0150257 | A1 | 6/2007 | Cancedda et al. |
| 2007/0150260 | A1 * | 6/2007 | Lee et al. .......................... 704/2 |
| 2007/0265825 | A1 | 11/2007 | Cancedda et al. |
| 2008/0249760 | A1 * | 10/2008 | Marcu et al. ...................... 704/2 |
| 2008/0262826 | A1 | 10/2008 | Pacull |
| 2008/0300857 | A1 | 12/2008 | Barbaiani et al. |
| 2009/0175545 | A1 | 7/2009 | Cancedda et al. |
| 2010/0268527 | A1 | 10/2010 | Tomeh et al. |
| 2011/0022380 | A1 | 1/2011 | Zaslavskiy et al. |

(Continued)

OTHER PUBLICATIONS

RWTH, UPVLC, XEROX, EML, "3.1.1: Progress Report on Massive Adaptation", transLectures, Transcription and Translation of Video Lectures, ICT Project 287755 Deliverable 3.1.1, Oct. 31, 2012.*

(Continued)

Primary Examiner — Brian Albertalli
(74) Attorney, Agent, or Firm — Fay Sharpe LLP (57) ABSTRACT A method adapted to multiple corpora includes training a statistical machine translation model which outputs a score for a candidate translation, in a target language, of a text string in a source language. The training includes learning a weight for each of a set of lexical coverage features that are aggregated in the statistical machine translation model. The lexical coverage features include a lexical coverage feature for each of a plurality of parallel corpora. Each of the lexical coverage features represents a relative number of words of the text string for which the respective parallel corpus contributed a biphrase to the candidate translation. The method may also include learning a weight for each of a plurality of language model features, the language model features comprising one language model feature for each of the domains.

21 Claims, 3 Drawing Sheets (56) References Cited

U.S. PATENT DOCUMENTS

| | | | |
|---|---|---|---|
| 2011/0022381 A1* | 1/2011 | Gao et al. | 704/7 |
| 2011/0178791 A1 | 7/2011 | Stymne et al. | |
| 2011/0282643 A1 | 11/2011 | Chatterjee et al. | |
| 2011/0288852 A1 | 11/2011 | Dymetman et al. | |
| 2011/0307245 A1 | 12/2011 | Hanneman et al. | |
| 2012/0041753 A1 | 2/2012 | Dymetman | |
| 2012/0101804 A1 | 4/2012 | Roth et al. | |
| 2012/0150529 A1* | 6/2012 | Kim et al. | 704/2 |
| 2012/0259807 A1 | 10/2012 | Dymetman | |
| 2013/0018650 A1* | 1/2013 | Moore et al. | 704/9 |

OTHER PUBLICATIONS

Bertoldi, et al. "Domain Adaptation for Statistical Machine Translation with Monolingual Resources", Proc. of the 4th EACL Workshop on Statistical Machine Translation, 2009, p. 182-189.

Brants, et at. "Large Language Models in Machine Translation", Proc. of the 2007 Joint Conf. on Empirical Methods in Natural Language Processing and Computational Natural Language Learning, Jun. 2007, pp. 858-867.

Callison-Burch, et al. "Findings of the 2011 Workshop on Statistical Machine Translation", Proc. of the 6th Workshop on Statistical Machine Translation, Jul. 2011, pp. 22-64.

Cettolo, et al. "WIT³: Web Inventory of Transcribed and Translated Talks", European Association for Machine Translation, 2012, pp. 261-268.

Chen, et al. "An Empirical Study of Smoothing Techniques for Language Modeling", Computer Science Group, Harvard, Aug. 1998, pp. 1-63.

Chiang, D. "A Hierarchical Phrase-based model for Statistical Machine Translation", ACL '05 Proceedings of the 43rd Annual Meeting on Association for Computational Linguistics, 2005, pp. 263-270.

U.S. Appl. No. 13/479,648, filed May 24, 2012, Nikoulina, et al.
U.S. Appl. No. 13/596,470, filed Aug. 28, 2012, Nikoulina, et al.

Chiang, et al. "Two Easy Improvements to Lexical Weighting", Proc. of the 49th Annual Meeting of the Assoc. for Computational Linguistics:shortpapers, Jun. 2011, pp. 455-460.

Crammer, et al. "Online Passive-Aggressive Algorithms", The Journal of Machine Learning Research,2006, vol. 7, pp. 551-585.

Eidelman, et al. "Topic Models for Dynamic Translation Model Adaptation", Assoc. for Computational Linguistics, 2012, pp. 1-6.

Hoang, et al. "Design of the Moses Decoder for Statistical Machine Translation", Software Engineering, Testing, and Quality Assurance for Natural Language Processing, 2008, pp. 58-65.

Koehn, P. "Eurparl: A Parallel Corpus for Statistical Machine Translation", *MT summit*, vol. 5, 2005, pp. 1-8.

Koehn, P., "Statistical Significance Tests for Machine Translation Evaluation", *Proceedings of EMNLP*, vol. 4, 2004, pp. 1-8.

Lambert, et al. "Collaborative Machine Translation Service for Scientific Texts", *Proc. of the 13th Conf. of the European Chapter of the Assoc. for Computational Linguistics (EACL)*, 2012, pp. 11-15.

Matsoukas, et al. "Discriminative Corpus Weight Estimations for Machine Translations", *Proc. of the 2009 Conf. on Empirical Methods in Natural Language Processing: Volume 2*, vol. 2, 2009, pp. 708-717.

Och, F.J., "Minimum Error Rate Training in Statistical Machine Translation", *Proc. of the 41st Annual Meeting on Assoc. for Computational Linguistics—Volume 1*, Jul. 2003, pp. 160-167.

Schwenk, et al. "Large and Diverse Language Models for Statistical Machine Translation", *Intl. Joint Conf. on Natural Language Processing*, 2008, pp. 661-668.

Steinberger, et al. "The JRC-Acquis: A Multilingual Aligned Parallel Corpus with 20+ Languages", *arXiv preprint cs/0609058* (2006), pp. 1-6.

Su, et al. "Translation Model Adaptation for Statistical Machine Translation with Monolingual Topic Information", Proc. of the 50th Annual Meeting of the Assoc. for Computational Linguistics, 2012, pp. 459-468.

Ueffing, N., "Semi-supervised model adaptation for statistical machine translation", *Machine Translation*, 2007, 21(2), pp. 77-94.

Papineni, et al. "BLEU: a method for automatic evaluation of machine translation", ACL-2002, pp. 311-318.

\* cited by examiner

MULTI-DOMAIN MACHINE TRANSLATION MODEL ADAPTATION

BACKGROUND

The work leading to this invention has received funding from the European Union Seventh Framework Programme (FP7/2007-2013) under grant agreement no 287755.

The exemplary embodiment relates to Statistical Machine Translation (SMT) and finds particular application in generating a model which is adapted to use in different domains.

Statistical Machine Translation systems use a model which is trained on a parallel corpus containing pairs of source and target sentences which are assumed to be a translation of each other, in at least the source to target direction. In a phrase based system, for example, the model stores corpus statistics that are derived for biphrases found in the parallel corpus. These statistics include phrasal and lexical probabilities that represent the probability that a given source phrase/word in the biphrase is translated to the corresponding target phrase/word. For a new source sentence to be translated, the SMT model is used to evaluate candidate biphrases which cover the source sentence, by using the respective corpus statics to determine an optimal set of the biphrases. To do this, the SMT model employs a translation scoring function which incorporates the lexical and phrasal probabilities as features that are weighted by respective weights. The feature weights are learned on a development corpus of source and target sentences. The translation scoring function may also incorporate a language model as one of the features, which focuses on the target side probabilities of given sequences of words.

The performance of SMT models tends to be very dependent on the congruence between the domain of the corpus that was used to train the model and the domain of the text which is to be translated. For example, SMT models can be trained on large collections of parliamentary proceeding translations, such as the Europarl corpus (see, Koehn, P., "Europarl: A Parallel Corpus for Statistical Machine Translation," in *MT Summit* (2005), hereinafter, "Koehn 2005"). While achieving high translation scores (e.g., BLEU scores) on unseen test sentences from the same collection, the systems trained on such a corpus typically underperform when translating text from a different domain, such as news stories or lecture transcriptions.

This problem could be addressed by using a training corpus which focuses on the domain of interest. For example, a corpus of news articles may provide better training samples for machine translation of news articles. However, parallel corpora are generated by human translators, which is time consuming and expensive. Thus, for most domains, a large-enough corpus of documents and their translations for training an SMT model is not generally available. However, there is often access to a small in domain corpus of documents.

One solution to this problem is to use the small in-domain corpus in combination with a large out-of-domain corpus for producing translation systems which combine the wide coverage of large out-of-domain corpora, with the information on domain-specific translation correspondences contained in in-domain data. Such methods which bring in- and out-of-domain training corpora together in an SMT system tend to produce systems that perform better than employing exclusively one or the other kind of data. However, such methods also involve the danger of diluting the domain-specific translation correspondences contained in the in-domain corpus with irrelevant out-of-domain ones. Also, when bringing all the training data together, the result may be an incoherent translation model which, while offering wide coverage, does not perform particularly well on any kind of data.

One approach for addressing these issues is to track from which subset of the training data each translation option (e.g., a phrase-pair) was extracted. This information could be used to target the translation of the in-domain data. For example, Matsoukas, et al., ("Discriminative Corpus Weight Estimation for Machine Translation," *Proc.* 2009 *Conf. on Empirical Methods in Natural Language Processing*, pp. 708-717, hereinafter Matsoukas 2009) introduce sentence level features which register for each training sentence-pair, the training corpus collection of origin and the language genre (domain) to which it belongs. Using these features, a perceptron is trained to compute a weight for each sentence-pair, which is used to down-weight the impact during training of translation examples that are not helpful on the test-set domain. Chiang, et al. ("Two Easy Improvements to Lexical Weighting," *Proc. 49th ACL Meeting: Human Language Technologies*, pp. 455-460 (2011), hereinafter, Chiang 2011) uses similar collection and genre features to distinguish between training sentence-pairs and computes separate lexical translation smoothing features from the data falling under each collection and genre. Tuning on an in-domain development set allows the system to learn a preference for the lexical translation options found in the training examples which are similar in style and genre.

However, while such systems can yield improvements, they lack flexibility in handling diverse domains.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 and U.S. Pub. Nos. 2004/0024581; 2004/0030551; 2006/0190241; 2007/0150257; 2008/0300857; 2007/0265825, 2011/0022380; 2011/0178791; 20110282643; 2011/0288852; 2011/0307245; 2012/0041753; 2012/0101804; 2012/0259807; U.S. application Ser. No. 13/479,648, filed on May 24, 2012, entitled DOMAIN ADAPTATION FOR QUERY TRANSLATION, by Vassilina Nikoulina, et al.; and U.S. application Ser. No. 13/596,470, filed on Aug. 28, 2012, entitled LEXICAL AND PHRASAL FEATURE DOMAIN ADAPTATION IN STATISTICAL MACHINE TRANSLATION, by Vassilina Nikoulina, et al.

Methods for building libraries of parallel corpora from which bilingual dictionaries can be generated are disclosed, for example, in U.S. Pub. Nos. 2008/0262826 and 20100268527.

Methods for evaluating the quality of machine translation are disclosed, for example, in U.S. Pub. Nos. 2005/0137854; and 20090175545; and U.S. Pat. No. 6,917,936.

BRIEF DESCRIPTION

In one aspect of the exemplary embodiment, a method includes training a statistical machine translation model which outputs a score for a candidate translation, in a target language, of a text string in a source language. The training includes learning a weight for each of a set of lexical coverage features that are aggregated in the statistical machine translation model. The lexical coverage features include a lexical coverage feature for each of a plurality of parallel corpora. Each of the lexical coverage features represents the relative number of words contributed by a respective one of the parallel corpora to the translation of the text string. The lexical coverage features are computed based on membership statistics which represent the membership, in each of the plurality of parallel corpora, of each biphrase used in generating the candidate translation. Each parallel corpus corresponds to a respective domain from a set of domains and includes pairs of text strings, each pair including a source text string in the source language and a target text string in the target language. The training may be performed with a computer processor.

In another aspect, a training system includes a training component which trains a statistical machine translation model for outputting a translation model score for a candidate translation, in a target language, of a text string in a source language. The training includes learning a weight for each of a set of lexical coverage features that are aggregated in the statistical machine translation model. The lexical coverage features include a lexical coverage feature for each of a plurality of parallel corpora, the lexical coverage features each representing a number of the words to which the respective parallel corpus contributed a biphrase in generating the candidate translation, the contribution being weighted according to a number of the parallel corpora contributing to each biphrase, each parallel corpus corresponding to a respective domain from a set of domains and comprising pairs of text strings, each pair comprising a source text string in the source language and a target text string in the target language. A computer processor implements the training component.

In another aspect, a translation system includes a decoder which, for a text string in a source language, generates candidate translations in a target language and a statistical machine translation model employed by the decoder for computing a score for each candidate translation. The statistical machine translation model includes a weight for each of a plurality of lexical coverage features that are aggregated in the model, the lexical coverage features including a lexical coverage feature for each of a plurality of parallel corpora, the lexical coverage features each representing a number of the words to which the respective parallel corpus contributed a biphrase in generating the candidate translation, the contribution being weighted according to a number of the parallel corpora contributing to each biphrase used in generating the translation. Each parallel corpus corresponds to a respective domain from a set of domains and includes pairs of text strings, each pair comprising a source text string in the source language and a target text string in the target language. Optionally, the statistical machine translation model also includes a weight for each of a set of language model features that are aggregated in the model, each of the language model features being output by a respective language model for a respective one of the domains computed on a respective target corpus, the target corpus comprising text strings in the target language. A computer processor implements the decoder.

DETAILED DESCRIPTION

Aspects of the exemplary embodiment relate to a system and method for training a model for Statistical Machine Translation and to a SMT translation system incorporating a model trained by the exemplary method.

Briefly, the SMT model is trained using several bilingual and monolingual training sets derived from two or more language domains having different linguistic styles or genres. The SMT model scores translations with a translation scoring function. The translation scoring function can be a standard log-linear translation model which has been extended with additional translation and language model features. In the training method, soft preferences are learned for translation options sourced from particular training sets. The exemplary translation scoring function employs features that track the relative contribution, in terms of source words translated, of each training set in formulating candidate translation hypotheses. Additionally, multiple language models may be incorporated into the translation scoring function which register how closely each complete translation hypothesis matches the linguistic domain of each respective training set. Each language model is thus trained on target-language data from a different domain. It has been found that the exemplary method can provide a translation model which improves upon existing translation systems. Translations can be scored, using a translation scoring metric which assesses how closely a translation matches a reference translation (human translation) of the source sentence. An example scoring metric is the BLEU score (see for example, Papineni, K.; Roukos, S.; Ward, T.; Zhu, W. J., "BLEU: a method for automatic evaluation of machine translation" ACL-2002, pp. 311-318), although other scoring metrics could be employed.

In the exemplary embodiment, the SMT system is described in terms of a Phrase-Based SMT (PBSMT) system. The example system can thus use as a baseline, a system analogous to that used, for example, in Koehn, et al., "Statistical Phrase-Based Translation," *Proc. 2003 Human Language Technology Conference of the North American Chapter of the Association for Computational Linguistics* (2003), hereinafter, Koehn 2003. It is to be appreciated, however, that the method is also applicable to other SMT systems, such as hierarchical and syntactically-driven SMT approaches employing log-linear translation models. See, for example, Chiang, D., "A Hierarchical Phrase-Based Model for Statistical Machine Translation," *Proc. 43rd Ann. Meeting of the Association for Computational Linguistics (ACL '05)*, pp. 263-270 (2005), for a discussion of hierarchical SMT systems.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 1:
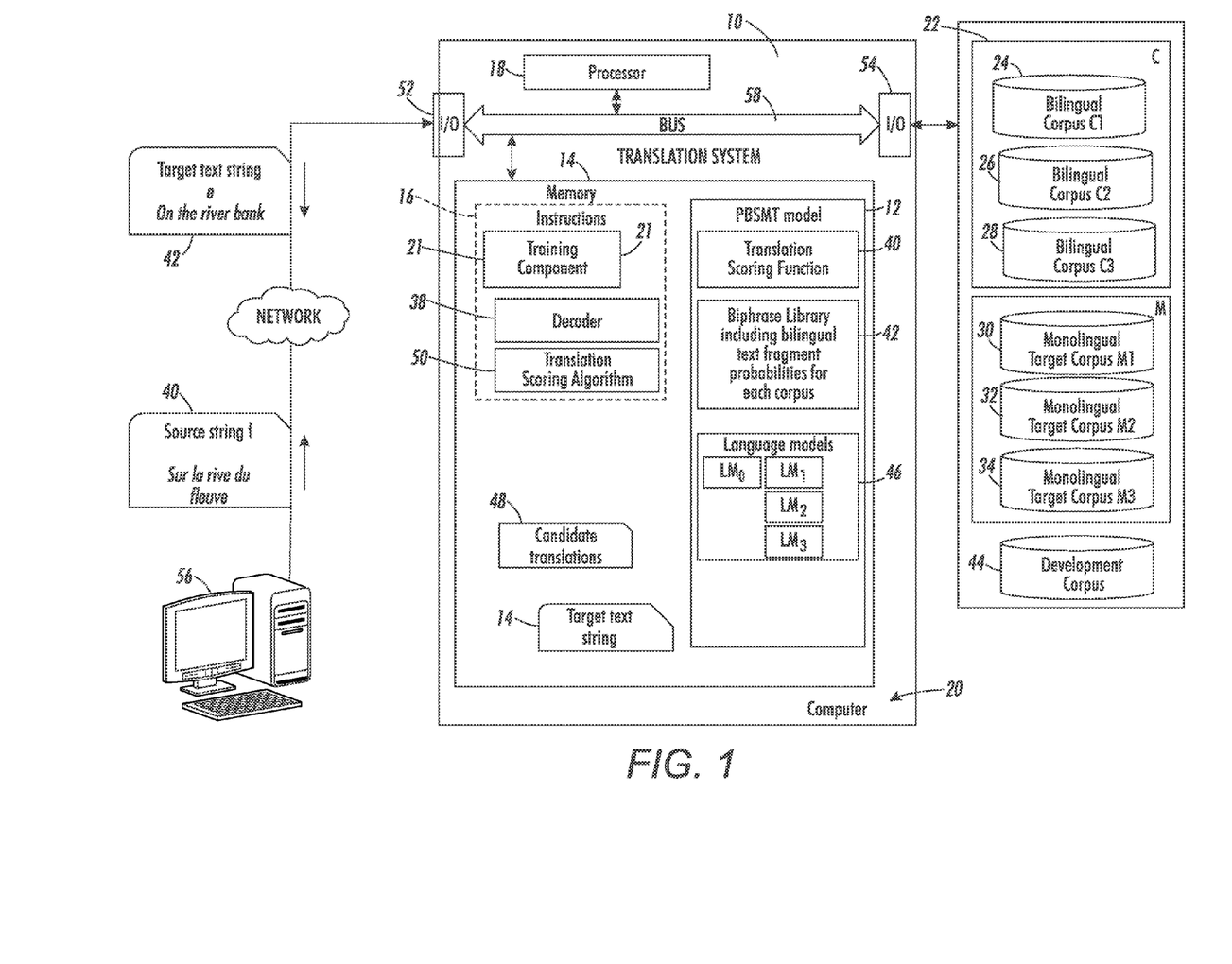
FIG. 1 is a functional block diagram of a system for training a statistical machine translation system.

With reference to FIG. 1, a system 10 for training an SMT model 12 for a statistical machine translation system is shown. The system 10 includes memory 14, which stores instructions 16, for performing the exemplary method and a processor 18 in communication with the memory for implementing the instructions. The SMT model 12 can be stored in system memory 14 or separate memory during training. The system 10 may be hosted by any suitable computing device or devices 20 and has access to a composite training corpus 22, which may be stored in system memory 14 or in a remote database communicatively connected with the system, as illustrated. The composite training corpus 22 includes a plurality of training corpora derived from documents for respective domains or genres. By way of example, FIG. 1 shows three bilingual corpora 24, 26, 28 comprising word-aligned sentence pairs. Each corpus is derived from a respective domain. For example, domain-specific corpus 24 may include French-English sentence pairs derived from Europarl documents, corpus 26 may include French-English sentence pairs derived from a documents in a second domain, such as news articles, and corpus 28 may include French-English sentence pairs derived from a third domain, such as conference publications. In general, there is little or no overlap between the documents for the three corpora. As will be appreciated, any number of bilingual training corpora may be provided, such as from 2-20, one for each of a finite set of language domains. Additionally, for training a language model, domain-specific monolingual target language corpora 30, 32, 34 are provided, one corpus for each of the domains. As will be appreciated, these monolingual corpora may be generated, at least in part, from the respective bilingual corpora 24, 26, 28. A small development corpus 36 includes source-target sentence pairs, such as from 1000 to 10,000 sentence pairs. A decoder 38 generates hypotheses (candidate translations, that may initially cover only a part of the source sentence), which are scored using the SMT model 12.

While documents can be considered as part of a domain if they have been manually labeled as such, other ways of generating domain-specific corpora can be considered. For example, topic models could be used to categorize composite training material in more homogeneous collections, instead of using the human classification found in corpora metadata. In such a system the classification may be soft, i.e., rather than categorizing a document into a single topic (corresponding to a "domain"), the document may be probabilistically classified over all topics.

As with a conventional PBSMT system, the exemplary SMT system, when trained, translates a source text string 40, such as a sentence f, in a first natural language, such as French, into a target string 42 such as a sentence e, in a second natural language, such as English, by segmenting the source string into phrases and translating each phrase independently. To do so, the SMT model 12 employs phrase-pairs (biphrases) extracted from the word-aligned parallel corpora 24, 26, 28, which can be reordered during decoding. Each biphrase includes a source language phrase of one or more words and a corresponding target language phrase of one or more words, which is predicted to be a translation of the source phrase, having been found in one or more of the parallel corpora 24, 26, 28. Some of the biphrases in the extracted set of biphrases have at least two or at least three words on the source and/or target sides. The decoder 38 generates a set of translation hypotheses using different combinations of the biphrases. The conditional probability p(e|f) of each translation hypothesis e to be the correct translation of the source sentence f is assessed by a log-linear combination of a number $\Phi$ of weighted features $\phi$. The weights $\lambda$ of the features are tuned on the small development corpus 44, which may be specific to a particular domain.

During decoding, the translation ê with the highest probability p(e|f) according to the model 12 is output. For example, the SMT model uses a translation scoring function can be expressed by log linear equation as exemplified by Eqns. 1 and 2.

$$\hat{e} = \arg\!\max_e p(e|f) = \arg\!\max_e \log p(e|f) \quad \text{(Eqn. 1)}$$

where:

$$\log p(e|f) = \sum_{i=1}^{\Phi} \lambda_i \log \phi_i(e, f) \quad \text{(Eqn. 2)}$$

Typical features $\phi$ include translation features. These are features derived from one or more of the bilingual corpora 24, 26, 28 (e.g., using the entire set of bilingual corpora as a single corpus) and may include one or more of conditional phrase and lexical translation probabilities, computed across both translation directions (source to target, target to source). The features $\phi$ may also include features tracking phrase reordering operations as well as word and phrase generation penalties. Additionally, the Language Model score $\phi_{LM}(e)$ assigned by a language model trained on all the target language monolingual data 30, 32, 34 is also included as a feature $\phi$ targeting the production of fluent target language output.

To make use of the different training corpora, additional translation model features $\phi$ are included in the log-linear model having the general form of Eqn. 2. These features are referred to herein as lexical coverage features. For every translation hypothesis formulated during decoding, these features track the number of source words that were translated using a translation option from each individual bilingual corpus 24, 26, 28 of the large composite training corpus. In the exemplary embodiment, each corpus is used to generate at least one respective lexical coverage feature for the translation scoring function, i.e., three lexical coverage features in the exemplary embodiment.

The lexical coverage features allow information on the origin of each translation option to be used to distinguish those that are relevant to the domain of interest. However, instead of indirectly employing this information to assign training data weights or using it to train separate lexical translation models, the present SMT model 12 allows direct monitoring and tuning the coverage of test sentences at the word level by translation correspondences extracted from each training data collection. In particular, each of the lexical coverage features is based on the number of words of the text string being translated that are translated using a biphrase originating from the respective parallel corpus, the count being weighted based on membership statistics for others of the parallel corpora. To enable these features to be computed, a biphrase table 42 includes membership statistics which identify, for each of a collection of biphrases (phrase pairs), the bilingual corpus (or corpora) from which the biphrase was extracted.

Figure 2:
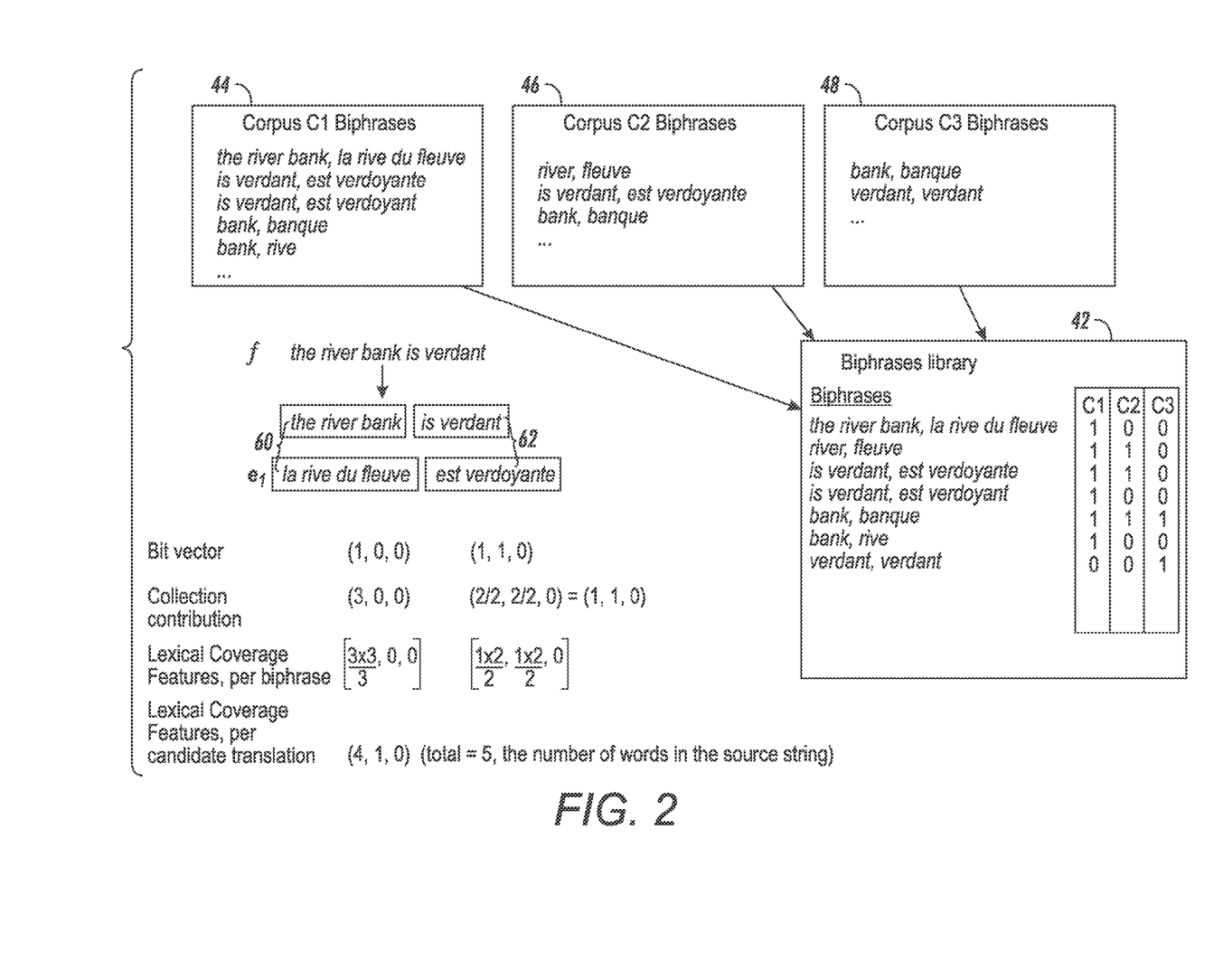
FIG. 2 illustrates computation of lexical coverage features for an example source sentence and candidate translation.

For example, as illustrated in FIG. 2, collections 44, 46, 48 of biphrases are extracted from the three bilingual corpora 24, 26, 28, respectively by the training component 21, if not already available. These biphrases are incorporated into a common biphrase table 42, which identifies the membership of each biphrase in each source corpus, e.g., as a simple presence or absence, although a frequency-based membership may also be employed. For example, in FIG. 2, the presence/absence of a biphrase in a given corpus is a binary value (a "1" indicates present in the corpus, a "0" indicates absence from the corpus). The bilingual corpora 24, 26, 28 differ in their biphrase occurrences due to their different subject matter. Thus, while some biphrases may occur in all corpora, others occur in fewer than all, such as one or more of the corpora. Thus, for example, the biphrase is verdant, est verdoyante is extracted from only two of the corpora 24, 26, so this biphrase is recorded as present for only these corpora in the biphrase table.

In some embodiments, a threshold number of occurrences (such as at least two, or at least three) may be required for a biphrase to be considered present in a corpus. However in one embodiment, a single instance is sufficient to indicate presence. In some embodiments, the biphrases may have already been filtered to retain only the most frequent ones, so the presence in this filtered set of biphrases may be used to determine presence/absence. As will be appreciated, the biphrase table 42 may include hundreds and more typically, thousands of biphrases, such as at least 10,000, or at least 20,000, and only a limited set is illustrated by way of example.

The computation of the lexical coverage features based on the membership statistics (presence/absence information) stored in the biphrase table is described below. Each of the lexical coverage features is associated with a respective weight $\lambda$.

Additionally, while not shown in FIG. 2, the biphrase table 42 may also store the corpus statistics for computing the conditional phrase and lexical translation probabilities. These may include, for each biphrase, the probability of finding the target phase given the corresponding source phrase (and vice versa) in the combined parallel corpus formed from corpora 24, 26, and 28, as well as corresponding lexical (word) probabilities.

In the exemplary embodiment, the system 10 also employs a set 46 of language models (FIG. 1). In particular, the main Language Model ($LM_0$), which is trained on all available composite target language data 30, 32, 34, is complemented (or replaced) with a plurality of Language Models $LM_1$, $LM_2$, $LM_3$, each of which is only trained on target language data belonging to a respective training collection 30, 32, or 34. The main language model, $LM_0$ assigns a score related to the overall conformity of target language output to the lexical and syntactic structure of the target language. In addition to this, each additional domain-specific language model $LM_1$, $LM_2$, $LM_3$ provides a measure of how close each candidate translation conforms to the characteristics of the data belonging to the respective target training data collection 30, 32, or 34 of the composite training corpus 22. By weighing these scores log-linearly and tuning their weights on a selected in-domain development corpus 44, the translation output is biased towards effectively combining the domain-specific characteristics of each subset of the training material to match the test data domain. As shown below, employing both approaches in tandem (plural LMs and lexical coverage features) provides a robust framework to increase in-domain performance when training on diverse sets of bilingual corpora. However, in other embodiments, only one of these approaches may be employed.

In the example embodiment, the log linear model used in the translation scoring function can be described by the following expression:

$$\log p(e|f) = \sum \lambda_{LC1} \log \varphi_{LC1} + \lambda_{LC2} \log \varphi_{LC2} + \lambda_{LC3} \log \varphi_{LC3} +$$
$$\lambda_{LM0} \log \varphi_{LM}^0 + \lambda_{LM1} \log \varphi_{LM}^1 + \lambda_{LM2} \log \varphi_{LM}^2 +$$
$$\lambda_{LM3} \log \varphi_{LM}^3 +$$
$$\lambda_{lexforward} \log \varphi_{lexforward} + \lambda_{lexreverse} \log \varphi_{lexreverse} +$$
$$\lambda_{phrforward} \log \varphi_{phrforward} + \lambda_{lexreverse} \log \varphi_{lexreverse} +$$
$$\lambda_{reordering} \log \varphi_{reordering,...etc}$$

where LC1, LC2, and LC3 represent the three lexical coverage features, one for each domain, $\log \varphi_{LM}^1$, $\log \varphi_{LM}^2$, and $\log \varphi_{LM}^3$ represent the three language model features, one for each domain, lexforward and lexreverse represent the lexical features/weights derived from the entire corpus C, phrforward and phrreverse represent the phrasal features/weights derived from the entire corpus C, reordering represents a reordering feature/weight which estimates the degree of reordering between the source and target strings (based on predicted word to word alignments).

As will be appreciated, the model is not limited to these features and that fewer, more or different features can be employed. Other features, such as phrase penalty (penalizing shorter phrases) may also be employed.

The SMT model 12 may be called on by the decoder 38, which proposes candidate translations 48 of source sentences in the bilingual development corpus 44 for evaluation by the model 12. A translation scoring component 50 evaluates the output one of the candidate translations by comparing it to a reference translation (the corresponding target sentence in the development corpus) and provides a score, such as a BLEU score. The training component 21 adjusts the weights of the model 12 until the BLEU score is optimized.

Computer system 20 includes one or more input/output (I/O) interfaces 52, 54 for communicating with external devices, such as a client computing device 56 and external memory storing the corpus 22. The various hardware components 14, 18, 52, 54 of the computer 20 may be all connected by a bus 58.

The client device 56 may include a display device, for displaying information to users, such as text 40 to be translated and translated text 42, and a user input device, such as a keyboard or touch or writable screen, and/or a cursor control device, such as mouse, trackball, or the like, for inputting/selecting the text to be translated and for communicating user input information and command selections to the client device's processor. In other embodiments, the system 10, or components thereof, may be resident on the client device 56.

The computer device 20 may be a PC, such as a desktop, a laptop, palmtop computer, portable digital assistant (PDA), server computer, cellular telephone, tablet computer, pager, combination thereof, or other computing device(s) capable of executing instructions for performing the exemplary method.

The memory 14 may represent any type of non-transitory computer readable medium such as random access memory (RAM), read only memory (ROM), magnetic disk or tape, optical disk, flash memory, or holographic memory. In one embodiment, the memory 14 comprises a combination of random access memory and read only memory. In some embodiments, the processor 18 and memory 14 may be combined in a single chip. The network interface 52, 54 allows the computer to communicate with other devices via a computer network, such as a local area network (LAN) or wide area network (WAN), or the internet, and may comprise a modulator/demodulator (MODEM) a router, a cable, and and/or Ethernet port. Memory 14 stores instructions for performing the exemplary method as well as the processed data.

The digital processor 18 can be variously embodied, such as by a single-core processor, a dual-core processor (or more generally by a multiple-core processor), a digital processor and cooperating math coprocessor, a digital controller, or the like. The digital processor 18, in addition to controlling the operation of the computer 20, executes instructions stored in memory 14 for performing the method outlined in FIG. 3.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 3:
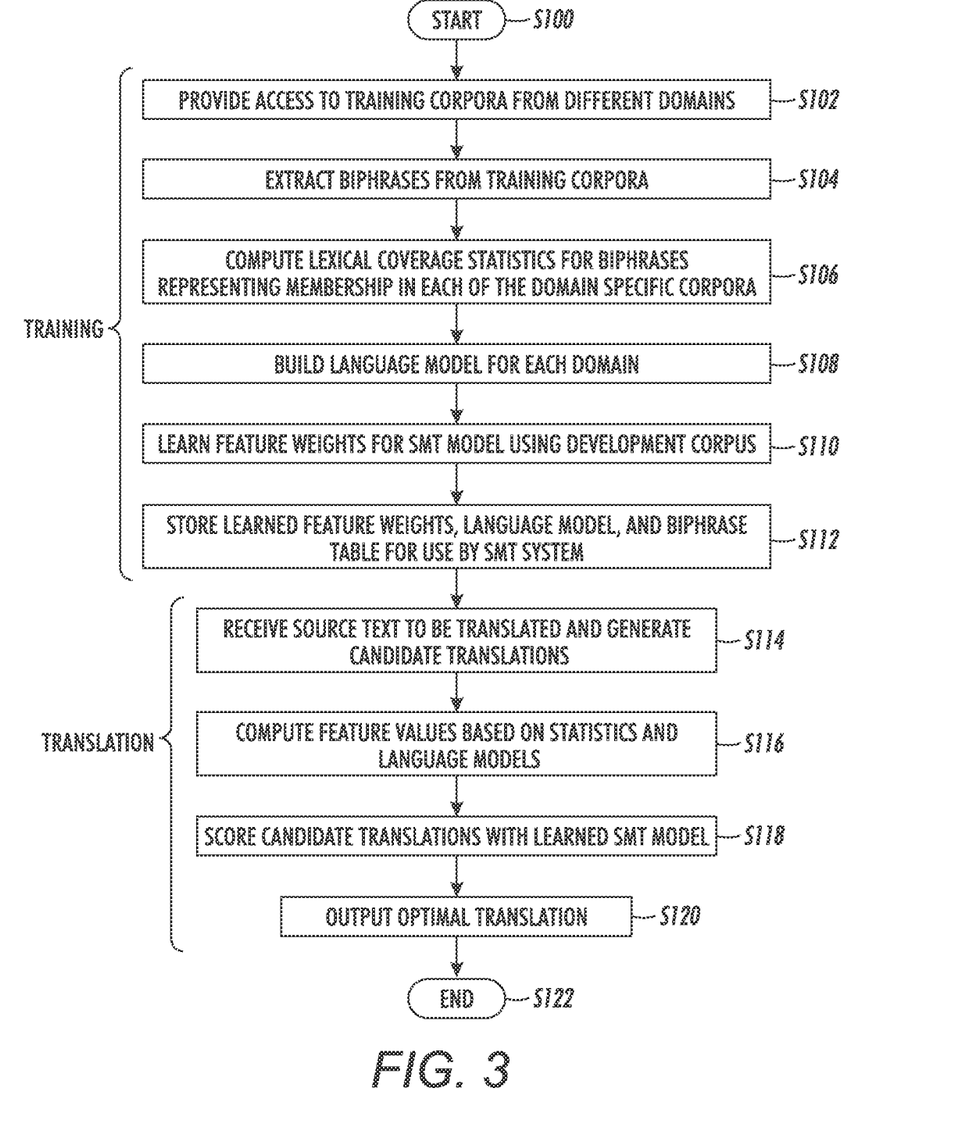
FIG. 3 is a functional block diagram of a statistical machine translation training system.

FIG. 3 illustrates an exemplary computer implemented method for training (and using) an SMT model which can be performed with the system of FIG. 1. The method begins at S100.

At S102, access to a composite training corpus 22 is provided.

At S104, biphrases are extracted from each training corpus and labeled according to source.

At S106, statistics are computed by the training component 21 from each of the corpora in the set, and for the composite parallel and bilingual corpora, as described above, which can be stored in memory, e.g., in a biphrase table 42. Among the computed statistics are the membership statistics representing the membership (e.g., presence or absence) of each biphrase in each domain-specific corpus, which are used for computing lexical coverage for each of the domains, as described above.

At S108, a domain-specific language model is built, by the training component for each of the domains, based on the respective domain-specific monolingual corpora 30, 32, 34, as well as a composite language model, based on the composite monolingual corpus C (30, 32, and 34).

At S110, feature weights for the features of the translation model 12 are optimized on the development set 44 of source/target text strings to optimize (e.g., maximize) a suitable translation scoring metric, such as the BLEU score.

At S112, the learned weights, biphrase table, and language models may be output to be stored in memory of a translation system, which can be similarly configured to the system 10, except that access to the corpus 22 and training component are not needed. In other embodiments, the same computing device 20 can be used for both training and translation, as in the system of FIG. 1. This ends the training stage.

At S114, for source text 40 to be translated, the trained system breaks the text down into strings, such as sentences, and the decoder 38 generates a set of candidate translations using a plurality of biphrases drawn from the biphrase table, each biphrase covering one or more words of the source string.

At S116, feature values are computed (or input directly) from the biphrase table statistics for each candidate translation, including the lexical coverage features that are computed from the membership statistics.

The candidate translations are evaluated at S118 using the trained model 12, and at S120, an optimal translation is output, i.e., the candidate translation, of those tested by the model, which provides the highest score according to Eqn. 2. In some embodiments, rather than outputting the translated text 40, the system may output information based thereon. For example, where the input text string 40 is a query, information retrieval may be performed with the translated query 42 and the information output may be in the form of responses to the query, such as a set of responsive target language documents.

The method ends at S122.

In some embodiments, weights are learned (at S110) for different domains, e.g., by using different development corpora drawn from parallel documents in the respective domains. In this case, step S114 may include receiving, as input, a selected domain for the translation, and the system may call up the respective weights for that domain for use in the SMT model 12. The domain may be selected by a user, e.g., by inputting a selection on the client device 56.

The method illustrated in FIG. 3 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method. As will be appreciated, while the steps of the method may all be computer implemented, in some embodiments one or more of the steps may be at least partially performed manually.

Further details on the system and method will now be provided.

Lexical Coverage Features

The first extension to the baseline SMT system involves the employment of additional lexical coverage features, one per sub-corpus 24, 26, 28. These track, during decoding, how many source words are translated by using a biphrase extracted from each collection of bilingual training data found in the overall composite training corpus 22.

Assume that the model is trained using a training corpus C composed as a set of a number of D constituent collections of training data $C_d$ (corpora 24, 26, 28 in the illustrated embodiment), i.e., the composite corpus is the union of the training corpora:

$$C = \bigcup_{d=1}^{D} C_d = \{C_1, C_2, \ldots, C_D\} \qquad \text{Eqn. 3}$$

During biphrase extraction, each extracted pair $\langle \tilde{e}, \tilde{f} \rangle$ of source phrase $\tilde{f}$ and target phrase $\tilde{e}$, is labeled with a bit-vector $b^{(\tilde{e},\tilde{f})}$ of length D. Each bit $b_d^{(\tilde{e},\tilde{f})}$ of the bit vector is set to 1 if the related biphrase can be extracted from the training data collection $C_d$, otherwise it is set to 0. Multiple bits can be set to 1 in a single $b^{\langle \tilde{e}, \tilde{f} \rangle}$, as it is possible that a biphrase can be extracted from more than one training data collection $C_d$. These bit vectors are stored in the biphrase library.

When a biphrase $\langle \tilde{e}, \tilde{e} \rangle$ with a source phrase $\tilde{f}$ of length $\tilde{l}$ (the number of words in $\tilde{f}$) is used in a translation hypothesis, the training collection $C_d$ that it was extracted from contributes $\tilde{l}/n$ words in the translation of source sentence f, where n represents the number of collections $C_d$ in which the biphrase is found. Thus, when n=1, the contribution=$\tilde{l}$. As will be appreciated, $\tilde{l}$ could alternatively or additionally be based on the number of words in the target phrase $\tilde{e}$.

Accordingly, the new lexical coverage features $\log \phi_{LC}{}^d(e, f)$ follow these assumptions to count how many source words were covered using biphrases extracted from each $C_d$. This provides a basic SMT model with D additional features, one for each training data collection. Their values are computed for a translation e of source sentence f constructed using phrase pairs $\langle \tilde{e}, \tilde{f} \rangle$ as follows.

First, a biphrase lexical coverage feature (one for each training data collection) is computed for each biphrase used in the hypothesis based on the membership statistics, e.g., as follows:

$$\log \varphi_{LC}^d(\langle \tilde{e}, \tilde{f} \rangle) = \frac{\tilde{l} * b_d^{\langle \tilde{e}, \tilde{f} \rangle}}{\sum_{j=1}^{D} b_j^{\langle \tilde{e}, \tilde{f} \rangle}} \qquad \text{Eqn. 4}$$

where $b_d^{\langle \tilde{e}, \tilde{f} \rangle}$ is the membership of the biphrase in the respective parallel corpus for domain d (which in the exemplary embodiment, this is a binary value that describes if the biphrase $\langle \tilde{e}, \tilde{f} \rangle$ can be extracted from the training corpus d: 0 or 1 in the example embodiment), and $b_j^{\langle \tilde{e}, \tilde{f} \rangle}$ is the value of $b_d^{\langle \tilde{e}, \tilde{f} \rangle}$ for a respective one of the domains, which is summed (or otherwise aggregated) over all the domains D. Specifically, the sum of these values for all training corpora (the denominator in Eqn. 4), is equal to the number of training corpora that the biphrase can be extracted from, i.e., the value of n. The biphrase features $\log \phi_{LC}{}^d(\langle \tilde{e}, \tilde{f} \rangle)$ may be stored in the biphrase table.

Then, for the overall hypothesis, each lexical coverage feature is a function of the lexical coverage feature computed for each biphrase, which can be computed as a log-linear combination by summing the previously computed lexical coverage features for each of the biphrases:

$$\log \phi_{LC}^d(e, f) = \sum_{\langle \tilde{e}, \tilde{f} \rangle} \log \phi_{LC}^d(\langle \tilde{e}, \tilde{f} \rangle) \qquad \text{Eqn. 5}$$

The sum of the lexical coverage features $\log \phi_{LC}{}^d(e,f)$ over all the domains thus equals the total number 1 of source words in the sentence.

As an example, for the source sentence f shown in FIG. 2 (the river bank is verdant) the system generates several hypotheses, such as hypothesis $e_1$. (la rive du fleuve est verdoyante). To generate this hypothesis, the decoder draws biphrases 60 and 62 from the biphrase library 42 and retrieves the corresponding membership statistics, i.e., bit vectors, which in the illustrated embodiment, for the three corpora are (1,0,0) and (1,1,0) respectively. The contribution from each collection is then computed for each bit as $\tilde{l}/n$. Since the first biphrase is of length 3 words on the source side and is only found in the first collection C1, i.e., n=1, the biphrase contribution for the first bit is 3/1=3. The other bits remain 0 so the collection contribution to the biphrase is (3,0,0). These values sum to 3, the number of words in the biphrase. For the second biphrase, which contains two words in the source side and which is found in n=2 collections, the corresponding collection contribution to the biphrase is (1, 1, 0).

The overall lexical coverage features for the entire hypothesis, computed according to Eqn. 4, are represented by the vector (4,1,0). This corresponds to the number of words of the source string to which each corpus has contributed a biphrase and in total equals the number l of words of the source string. The three values in the vector may be input directly into as the three lexical coverage feature values $\log \phi_i(e,f)$. In other embodiments, they can be normalized, e.g., to sum to 1. The lexical coverage feature values input to the translation scoring function thus represent the relative number of words of the source phrase that each corpus contributes to generating the candidate translation (by contributing biphrases that are used to cover those words).

Domain-Specific Language Model Array

Typical PBSMT systems employ a single Language Modeling feature $\phi_{LM0}(e)$ 9 which allows the decoder 38 to show a preference for output sentences which are fluent in the target language. This LM is commonly trained on all available target language resources, comprising of the target side of the bilingual corpora $C_d$, together with any other available target monolingual resources.

However, when the monolingual training data are composed of a large array of individual collections, each falling under a different language domain, the LM score provided by such a feature can: (a) be dominated by the style and genre of the larger data collections that provide more training examples, or (b) assign scores preferring a 'lowest common denominator' kind of language use, promoting target output which favors general language use, but which fails to match any style or genre in particular, including that of the test data domain.

In order to address these issues, the method includes training individual Language Models, one from each target monolingual data collection 30, 32, 34, and uses these LMs side-by-side with a main LM trained on all the available target data. Namely, if the target language corpus M consists of M collections of target sentences $M_m$, then from each $M_m$ a separate LM feature $\phi_{LM}{}^m(e)$ is trained and used in addition to the main LM feature $\phi_{LM}{}^0(e)$.

For the total LM array $\langle \phi_{LM}{}^0, \phi_{LM}{}^1, \ldots, \phi_{LM}{}^M \rangle$, the feature weights $\langle \lambda_{LM}, \lambda_{LM}{}^1, \ldots, \lambda_{LM}{}^M \rangle$ are tuned together with the rest of the feature weights on a development set. This allows the system to set a preference during decoding for the mixture of general language usage (as scored by $\phi_{LM}(e)$) and particular styles and genres (as scored by each $\phi_{LM}{}^m(e)$) that matches the test domain.

Each of the language models $LM_0, LM_1, LM_2, LM_3$ can be an n-gram model, where n can be, for example, from 2-10, such as 3-6, e.g., 5. Thus, for example, in the case of n=5, the system collects statistics from the domain specific target corpus as to the frequency of each of (or a large collection of) sequences of five words found in the corpus.

Given an input sentence to be translated, each language model $\langle \phi_{LM}{}^0, \phi_{LM}{}^1, \ldots, \phi_{LM}{}^M \rangle$, outputs a respective language model score for the entire sentence, e.g., between 0 and 1, which corresponds to the probability that the candidate translation is fluent in the target language. The probability is generally computed by computing the probability of seeing each word in the presence of the previous four words, if present, and multiplying these probabilities together. This score is input to the SMT model 12 as the respective LM feature.

Further details on training and using language models which may be used herein are given in Schwenk, H. and Koehn, P., "Large and Diverse Language Models for Statistical Machine Translation," *Proc. Intern'l Joint Conf. on Natural Language Processing*, pages 661-666, Hyderabad, India (2008); and Chen, S. F., et al., "An Empirical Study of Smoothing Techniques for Language Modeling" *Computer Speech & Language*, 13(4):359-393 (1999).

Optimizing Feature Weights (S110)

In general, the aim of this step is to optimize the scores provided by the translation scoring metric 50 (e.g., BLEU score) over all the training samples in the development corpus. The learning of the weights uses the decoder 38 to generate candidate translations for a source sentence from the training corpus by drawing biphrases from the biphrase table to generate a candidate translation. Each candidate translation is evaluated using a current set of model weights and feature values computed using the biphrase table statistics. The weights are adjusted until an optimal combination of weights is found which optimizes the translation scoring metric over the development corpus as a whole. See, e.g., Papineni, K., et al., "BLEU: a method for automatic evaluation of machine translation" in *ACL-2002: 40th Annual meeting of the ACL*, pp. 311-318 for a discussion of the BLEU score. Another translation scoring metric is the TER (Translation Error Rate). See Snover, M., et al., "A Study of Translation Edit Rate with Targeted Human Annotation," Proc. Assoc. for Machine Translation in the Americas, 2006. Other methods for evaluating the quality of machine translation are disclosed, for example, in U.S. Pub. Nos. 2005/0137854 and 2009/0175545 and U.S. Pat. No. 6,917,936, the disclosures of which are incorporated herein by reference. The development set 44 may be an entirely in-domain parallel corpus (in the domain to be used in translation) or may be supplemented with out-of-domain translation pairs.

Various methods are available for tuning the weights of the features in the log-linear model. Due to the relatively large additional number of features, a suitable tuning method is the Moses implementation of the Margin Infused Relaxed Algorithm (MIRA) (See, Crammer, K., et al., "Online Passive-Aggressive Algorithms," *J. Machine Learning Res.*, 7:551-585 (2006). However, other algorithms, such as the Minimum Error Rate Training (MERT) algorithm may alternatively be used to tune the log-linear model weights (see, Och, F. J., "Minimum Error Rate Training in Statistical Machine Translation," *Proc. 41st Annual Meeting of the Assoc. for Computational Linguistics*, pp. 160-167, Sapporo, Japan (2003)).

The tuning may involve initializing a set of feature weights, and for each (or at least one) source sentence in the development corpus 44, generating a set of translations and identifying the N best translations using the model according to the current feature weights. N can be for example, at least 50, or at least 100 or 500 and can be up to 1000. The tuning algorithm looks at how the weights can be adapted so that the translations with higher BLEU (or other scoring metric) scores can be positioned higher on the N-best list. The new feature weights are used as the current feature weights for the next iteration. The method can proceed through several such iterations until no significant improvement can be achieved or until another stopping criterion is met.

Decoder

As the decoder 38, any suitable decoder can be used, such as the Moses decoder. See, for example, Hoang, H. and Koehn, P., "Design of the Moses Decoder for Statistical Machine Translation," In *ACL Workshop on Software Engineering, Testing, and Quality Assurance for NLP* 2008.

Without intending to limit the scope of the exemplary embodiment, the following examples demonstrate the performance of the exemplary method.

EXAMPLES

In order to evaluate the method empirically, a combined training corpus was compiled which consists of six distinct collections of bilingual training data between English and French, differing substantially in style and genre. The collections include content from:

1. Europarl: (Koehn, 2005),
2. JRC-Acquis (see, Steinberger, et al., "The JRC-Acquis: A multilingual aligned parallel corpus with 20+ languages," *Proc. 5th Intern'l Conf. on Language Resources and Evaluation (LREC 2006)*.
3. WIT-3 (see, Cettolo, et al., "WIT3: Web Inventory of Transcribed and Translated Talks," *Proc. 16th Conf. of the European Association for Machine Translation (EAMT 2012)*, pp. 261-268).
4. 2011 WMT-Newstext (see, Callison-Burch, C., et al., "Findings of the 2011 Workshop on Statistical Machine Translation," *Proc. Sixth Workshop on Statistical Machine Translation*, pp. 22-64 (2011))
5. COSMAT corpora (see, Lambert, et al., "Collaborative Machine Translation Service for Scientific texts," *Proc. Demonstrations at the 13th Conf. of the European Chapter of the Association for Computational Linguistics*, pp. 11-15 (2012),
6. A small corpus of translations of transcriptions from scientific conference lectures.

Table 1 lists the corpora and their key properties.

TABLE 1

Bilingual training data collections; size is measured in sentence-pairs

| Corpus | Genre | Style | Size |
| --- | --- | --- | --- |
| Europarl | Parliamentary proceedings | Formal speeches | 1M |
| JRC-Acquis | Legal | Formal text | 1.2M |
| WIT-3 | Science for laymen | Lectures | 145K |
| WMT-Newstext | News | Articles | 137K |
| COSMAT | Science for specialists | Abstracts & Articles | 56K |
| Conference Lectures | Science for specialists | Lectures | 3.2K |

Experiments were performed with two different domain adaptation scenarios, translating from English to French. First, translating transcriptions from the 'conference lecture' domain was performed, where a very limited in-domain corpus is available (3,200 sentence-pairs), in addition to 1000 development corpus sentence pairs and 1,300 sentence pairs for test data. Second, the task of translating news text from the WMT-Newstext domain was investigated, where a sizeable in-domain corpus exists (137,000 sentence-pairs), together with a 2,000 sentence-pair development set and a 3000 sentence-pair test set.

For the experiments, the Moses implementation of a PBSMT system (see, Hoang and Koehn, 2008) was used along with its default training and tuning parameters. A series of single-domain baseline systems were built, each trained solely on each individual training data collection. Language models for each system were trained on the target side of each corpus and tuning of the feature weights was performed with the MERT algorithm (see, Och, 2003). A further baseline system was trained for each experimental setting, using the concatenation of all bilingual and monolingual data collections to train the translation and language model respectively.

Table 2 lists the average BLEU scores achieved from each such system for the two translation tasks.

TABLE 2

Single-domain and concatenated training data baselines, for the two test data domains

| Test Domain | Europarl | JRC-Acq. | WIT-3 | WMT-News | COSMAT | Conf. Lect. | Concat. |
|---|---|---|---|---|---|---|---|
| Conf. Lect. | 23.93 | 18.14 | 28.36 | 22.27 | 19.08 | 24.04 | 30.93 |
| WMT-News | 24.47 | 20.50 | 22.38 | 24.05 | 15.23 | 11.02 | 28.20 |

The value of in-domain training data is highlighted by the strong performance of models trained on the in-domain corpora. Surprisingly, this applies even when training both translation (bilingual corpus features) and language model features was performed on only the tiny 'Conference Lectures' corpus of 3.2K sentence-pairs. Still, larger corpora from more or less closely related domains (WIT-3 for the 'Conference Lectures' task, Europarl for the WMT-Newstext' task) are able to score even higher than the more limited in-domain data, while the rest of the scores correlate with domain distance and corpus size. It can be seen that the baseline training on the concatenation of all available resources offers the most competitive performance, significantly outperforming all other single-domain systems in both experimental settings.

Having established and tested the baseline systems (without the lexical coverage features and domain-dependent language models) experiments were performed by extending the concatenated training data baseline with the lexical coverage (lexcov) and domain-specific LM (domain-lm) features. The six lexical coverage features (one for each training data collection) were always used to complement the existing features of the baseline system (conditional phrase and lexical translation probabilities, phrase penalty) in a biphrase table which includes the same biphrases as the baseline. Similarly, the array of six domain-specific 5-gram LMs, smoothed using modified Kneser-Ney, complement, as additional features, the LM trained on the combination of all available target language data (see, Chen, S. F et al., "An Empirical Study of Smoothing Techniques for Language Modeling" *Computer Speech & Language,* 13(4):359-393 (1999)) for a description of the smoothing method).

Table 3 lists the performance of the adapted models in comparison to the baseline system (no lexical coverage or in-domain language model features). For each experimental setting, one system was tested which only extends the baseline phrase-table with the lexcov features, one which only introduced the domain-lm features and a third system which combined both kinds of features.

A "+" indicates that the particular feature type was employed. The 'concatenated' training data baseline is compared to systems extending it with the additional lexical coverage (lexcov) and domain-specific LM (domain-lm) features. Scores with a (*) are significantly better than the best-scoring baseline at the 1% level. The best system(s) (if more than one, indistinguishable at the 1% significance level) are marked in bold.

TABLE 3

Adapted models trained on multi-domain data collections.

| Test Domain | baseline | lexcov | domain-lm | Tuning | BLEU |
|---|---|---|---|---|---|
| Conference Lectures | + | | | MERT | 30.93 |
| Conference Lectures | + | | | MIRA | 31.52 |
| Conference Lectures | + | + | | MIRA | 32.36* |
| Conference Lectures | + | | + | MIRA | 32.48* |
| Conference Lectures | + | + | + | MIRA | 32.44* |
| WMT-Newstext | + | | | MERT | 28.20 |
| WMT-Newstext | + | | | MIRA | 28.04 |
| WMT-Newstext | + | + | | MIRA | 28.41* |
| WMT-Newstext | + | | + | MIRA | 28.82* |
| WMT-Newstext | + | + | + | MIRA | 29.01* |

It can be seen that, although the baseline system was already competitive in relation to the single-domain systems, as shown in Table 2, the exemplary systems which extend it with each of the two sets of contributed features further raise performance, as measured by BLEU, with the improvement being statistically significant at the 1% level using the test of Koehn (Koehn, P., "Statistical Significance Tests for Machine Translation Evaluation," in Lin, D. and Wu, D., eds, *Proc. EMNLP* 2004, pp. 388-395, (2004)). While both kinds of features contribute towards an in-domain performance improvement, combining them together manages to consistently deliver strong improvements across both test domains, with significantly higher BLEU than using each feature set on its own registered for the WMT-Newstext' task.

The Moses implementation of the MIRA algorithm (Crammer, et al.) and the MERT system were used to tune the log-linear model weights. In order to make sure that the performance improvement does not follow solely from using a different tuning algorithm, a baseline system was also tuned using the MIRA algorithm. Such a baseline actually registers a drop in performance for the 'WMT-Newstext' task (28.04 BLEU) in comparison to using MERT for tuning. For the 'Conference Lectures' task, the BLEU score of the MIRA-tuned baseline increases to 31.52 BLEU, still at a level that is significantly lower than the best performing system by close to 1 BLEU.

The results shown that an increase in in-domain translation performance can be achieved by one or both of two adaptation methods, one targeting the translation model and one focusing on the language modeling component of phrase-based systems. Information on the membership of training examples in training data collections is used to combine together translation options extracted from each collection better during decoding. The use of an array of domain-specific language models is able to provide a blend of the individual genre and style of each collection, which matches more closely the test data domain. The combination of the two methods is seen as an effective and relatively simple to implement method to raise in-domain performance when training on multi-domain corpora.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method comprising:
   training a statistical machine translation model which outputs a score for a candidate translation, in a target language, of a text string in a source language, the training comprising:
      learning a weight for each of a set of lexical coverage features that are aggregated in the statistical machine translation model, the lexical coverage features comprising a lexical coverage feature for each of a plurality of parallel corpora, each of the lexical coverage features representing a relative number of words contributed by a respective one of the parallel corpora to the translation of the text string, the lexical coverage features being computed based on membership statistics which represent the membership, in each of the plurality of parallel corpora, of each biphrase used in generating the candidate translation, each parallel corpus corresponding to a respective domain from a set of domains and comprising pairs of text strings, each pair comprising a source text string in the source language and a target text string in the target language; and
   using the trained model in a statistical machine translation system for translation of a new source text string in the source language,
   wherein the training is performed with a computer processor.

2. The method of claim 1, wherein in the model, the features are aggregated in a log-linear combination.

3. The method of claim 1, wherein the lexical coverage features each represent a count the number of words of the text string that are translated using a biphrase originating from the respective parallel corpus, the count being weighted based on the membership statistics for others of the parallel corpora.

4. The method of claim 1, wherein the learning weights further comprises computing lexical coverage features for candidate translations of each of a collection of source sentences in a development corpus.

5. The method of claim 1, wherein the membership in each parallel corpus is based on a presence or absence in that corpus.

6. The method of claim 5, wherein for at least some of the biphrases, the membership of the biphrase denotes a presence in at least two of the parallel corpora.

7. The method of claim 1, wherein the training comprises computing the lexical coverage features for each of a collection of source strings and corresponding candidate translations generated with biphrases from a collection of biphrases and selecting the weights for the lexical coverage features to optimize a probability that candidate translations that have higher scoring metric scores have higher translation model scores.

8. The method of claim 1, further comprising generating the membership statistics by determining, for each biphrase in a collection of biphrases, whether the biphrase is present in each of the parallel corpora and for each parallel corpus where the biphrase is present, storing a value in a bit vector corresponding to the presence.

9. The method of claim 8, wherein the lexical coverage features represent a contribution of each of the parallel corpora to the candidate translation which is based on contributions of the biphrases used in the generating the candidate translation that are based on the membership statistics for the biphrase.

10. The method of claim 9, wherein the contribution of each of the parallel corpora to each biphrase is based on a length, in words, of at least one of the target phrase and the source phrase in that biphrase.

11. The method of claim 1, wherein each of the lexical coverage features is computed according to the expression:

$$\log \phi^d_{LC}(e, f) = \sum_{\langle \tilde{e}, \tilde{f} \rangle} \log \phi^d_{LC}(\langle \tilde{e}, \tilde{f} \rangle)$$

where $$\log \varphi^d_{LC}(\langle \tilde{e}, \tilde{f} \rangle) = \frac{\tilde{l} * b_d^{\langle \tilde{e}, \tilde{f} \rangle}}{\sum_{j=1}^{D} b_j^{\langle \tilde{e}, \tilde{f} \rangle}}$$

and where each $\langle \tilde{e}, \tilde{f} \rangle$ represents a biphrase using in generating a candidate translation, where $\tilde{f}$ represents a source phrase and $\tilde{e}$ represents a target phrase;
$\tilde{l}$ represents a length, in words, of at least one of the source phrase $\tilde{f}$ and the target phrase $\tilde{e}$;
$b_d \langle \tilde{e}, \tilde{f} \rangle$ is a value which represents the membership of the biphrase in a respective one of the parallel corpora of biphrase $\langle \tilde{e}, \tilde{f} \rangle$; and
$b_j \langle \tilde{e}, \tilde{f} \rangle$ represents the value of $b_j \langle \tilde{e}, \tilde{f} \rangle$, which is computed for each corpus.

12. The method of claim 1, wherein the training further comprises:
   learning a weight for each of a plurality of language model features that are aggregated in the statistical machine translation model, the plurality of language model features comprising a language model feature for each of the domains, each language model feature being computed for the candidate translation using a language model derived from a respective target corpus, the target corpus comprising text strings in the target language.

13. The method of claim 1, wherein the training of the statistical machine translation model is performed on a development corpus comprising pairs of text strings in one of the set of domains, each pair comprising a source text string in a source language and a target text string in a target language.

14. The method of claim 1, wherein the set of domains comprises at least three domains, each domain associated with a respective different one of the parallel corpora.

15. The method of claim 1 wherein each of the biphrases comprises a source phrase in the source language and a target phrase in the target language, each of the source and target phrases comprising at least one word.

16. A computer program product comprising a non-transitory storage medium storing instructions which, when executed by a computer processor, perform the method of claim 1.

17. A system comprising a non-transitory memory storing instructions for performing the method of claim 1 and a computer processor, in communication with the memory, which executes the instructions.

18. A system comprising:
   a training component which trains a statistical machine translation model for outputting a translation model score for a candidate translation, in a target language, of a text string in a source language, the training comprising:
      learning a weight for each of a plurality of lexical coverage features that are aggregated in the statistical machine translation model, the lexical coverage features comprising a lexical coverage feature for each of a plurality of parallel corpora, the lexical coverage features each representing a number of the words to which the respective parallel corpus contributed a biphrase in generating the candidate translation, weighted according to a number of the parallel corpora contributing to each biphrase, each parallel corpus corresponding to a respective domain from a set of domains and comprising pairs of text strings, each pair comprising a source text string in the source language and a target text string in the target language;

a decoder which uses trained model for translation of a new source text string in the source language; and a computer processor which implements the training component.

19. The system of claim 18, wherein the training is performed on a development corpus comprising pairs of text strings in one of the set of domains, each pair comprising a source text string in a source language and a target text string in a target language, the system further comprising:

a decoder which generates candidate translations of source text strings of the development corpus which are scored by the model; and a translation scoring component which outputs a translation scoring metric score for at least some of the candidate translations, the training component learning the weights to optimize a probability that candidate translations with higher translation scoring metric scores are among those candidate translations having higher translation model scores.

20. The system of claim 18, wherein the training further comprises:

learning a weight for each of a plurality of language model features that are aggregated in the statistical machine translation model, the plurality of language model features comprising a language model feature for each of the domains, each language model feature being computed for the candidate translation using a language model derived from a respective target corpus, the target corpus comprising text strings in the target language.

21. A translation system comprising:

a decoder which, for a text string in a source language, generates candidate translations in a target language;

a statistical machine translation model employed by the decoder for computing a score for each candidate translation, the statistical machine translation model comprising:

a) a weight for each of a plurality of lexical coverage features that are aggregated in the model, the lexical coverage features comprising a lexical coverage feature for each of a plurality of parallel corpora, the lexical coverage features each representing a number of the words to which the respective parallel corpus contributed a biphrase in generating the candidate translation, weighted according to a number of the parallel corpora contributing to each biphrase used in generating the translation; and optionally, b) a weight for each of a set of language model features that are aggregated in the model, each of the language model features being output by a respective language model for a respective one of the domains computed on a respective target corpus, the target corpus comprising text strings in the target language;

the system outputting an optimal one of the candidate translations, based on the computed scores, or information based thereon; and a computer processor which implements the decoder.

* * * * *